United States Patent
Vankieken

(10) Patent No.: US 12,267,678 B2
(45) Date of Patent: Apr. 1, 2025

(54) METHOD FOR SECURING ACCESSES TO A NETWORK, SYSTEM AND ASSOCIATED DEVICE

(71) Applicant: SAGEMCOM BROADBAND SAS, Rueil Malmaison (FR)

(72) Inventor: Nicolas Vankieken, Rueil Malmaison (FR)

(73) Assignee: SAGEMCOM BROADBAND SAS, Bois-Colombes (FR)

(*) Notice: Subject to any disclaimer, the term of this patent is extended or adjusted under 35 U.S.C. 154(b) by 352 days.

(21) Appl. No.: 17/108,501

(22) Filed: Dec. 1, 2020

(65) Prior Publication Data

US 2021/0185534 A1    Jun. 17, 2021

(30) Foreign Application Priority Data

Dec. 13, 2019 (FR) ................................... 1914386

(51) Int. Cl.
  *H04W 12/086* (2021.01)
  *H04L 9/40* (2022.01)
  (Continued)

(52) U.S. Cl.
  CPC ....... *H04W 12/086* (2021.01); *H04L 63/0209* (2013.01); *H04L 63/10* (2013.01);
  (Continued)

(58) Field of Classification Search
  CPC ... H04W 12/086; H04W 12/66; H04W 24/02; H04W 12/122; H04W 12/73;
  (Continued)

(56) References Cited

U.S. PATENT DOCUMENTS

| 2004/0198319 A1 | 10/2004 | Whelan et al. | |
| 2012/0287914 A1* | 11/2012 | Smith | H04W 4/06 370/338 |

(Continued)

FOREIGN PATENT DOCUMENTS

| WO | WO-2016081837 A1 * | 5/2016 | ........... G06F 21/577 |
| WO | WO-2017050108 A1 * | 3/2017 | ........... H04W 12/06 |
| WO | 2019/084340 A1 | 5/2019 | |

OTHER PUBLICATIONS

Manish Thapa, "Mitigating Threats in IoT Network using Device Isolation", Feb. 4, 2018, Master's Thesis, obtained online from <https://core.ac.uk/download/pdf/154758802.pdf>, retrieved on Feb. 11, 2023 (Year: 2018).*

(Continued)

*Primary Examiner* — Zhimei Zhu
(74) *Attorney, Agent, or Firm* — R. Brian Drozd; Williams Mullen

(57) ABSTRACT

A securing method in a computing or communication network, the method making it possible to isolate a station connected to a wireless communication device of the network and identified as not complying with the security requirements defined for the network. The isolation of the connected station is performed automatically by a connection to a quarantine zone of the network, excluded from a so-called trusted zone. The device identified as not complying with the security requirements can, for example, access a wide-area network, such as the internet, but cannot access a secure local network.

9 Claims, 6 Drawing Sheets

(51) Int. Cl.
  *H04W 12/122* (2021.01)
  *H04W 12/60* (2021.01)
  *H04W 12/73* (2021.01)
  *H04W 84/12* (2009.01)
  *H04W 12/71* (2021.01)

(52) U.S. Cl.
  CPC ......... *H04W 12/122* (2021.01); *H04W 12/66* (2021.01); *H04W 12/73* (2021.01); *H04W 84/12* (2013.01); *H04W 12/71* (2021.01)

(58) Field of Classification Search
  CPC .. H04W 12/71; H04W 84/12; H04L 63/0245; H04L 63/126; H04L 63/0209; H04L 63/10
  See application file for complete search history.

(56) References Cited

U.S. PATENT DOCUMENTS

| 2013/0201979 | A1* | 8/2013 | Iyer | H04L 12/4679 |
| | | | | 370/338 |
| 2017/0134416 | A1 | 5/2017 | Kawakita | |
| 2019/0044948 | A1* | 2/2019 | Beals | H04L 63/105 |
| 2020/0153846 | A1* | 5/2020 | Srivastava | H04W 4/80 |
| 2020/0351664 | A1* | 11/2020 | Murthy | H04W 12/64 |
| 2021/0144584 | A1* | 5/2021 | Chandra | H04W 76/15 |
| 2021/0385229 | A1* | 12/2021 | Beals | H04W 4/70 |

OTHER PUBLICATIONS

Manish Thapa, "Mitigating Threats in IoT Network using Device Isolation", Feb. 4, 2018, Master Thesis, obtained online from <https://aaltodoc.aalto.fi/server/api/core/bitstreams/a172a009-83dd-4901-b415-79b4144bdd8a/content>, retrieved on Jul. 17, 2024 (Year: 2018).*

Jul. 28, 2020 Search Report issued in French Patent Application No. 1914386.

* cited by examiner

[Fig. 1]
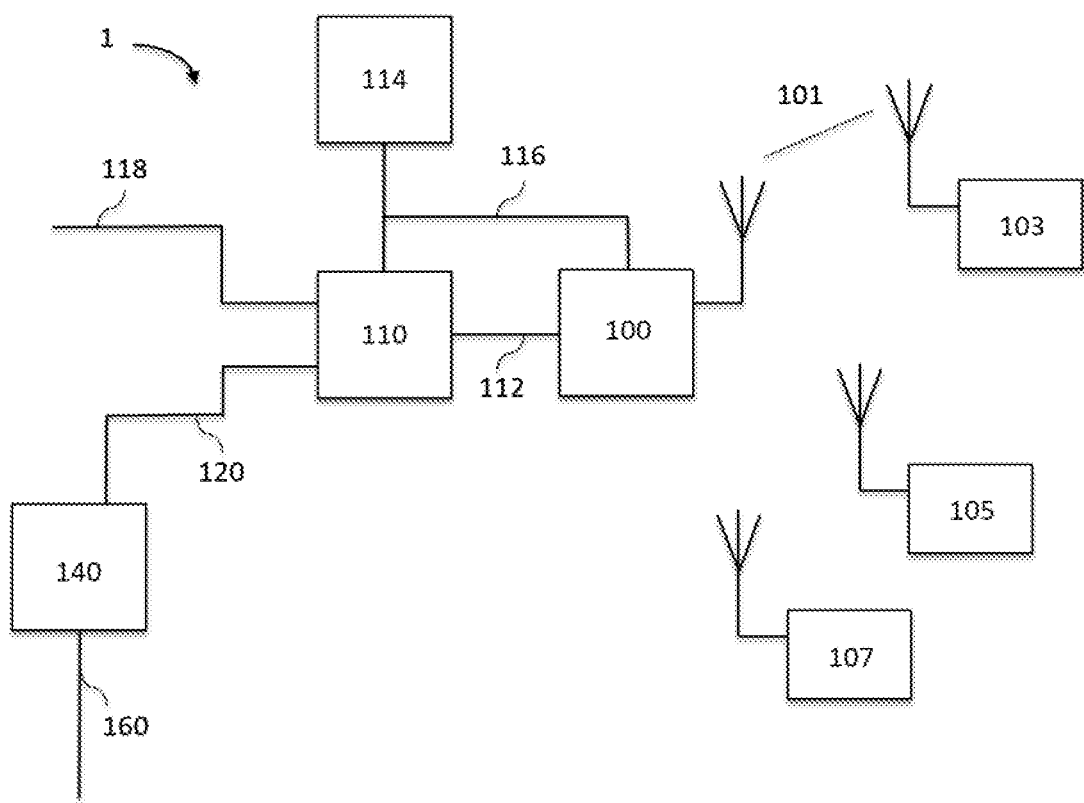

[Fig. 2]
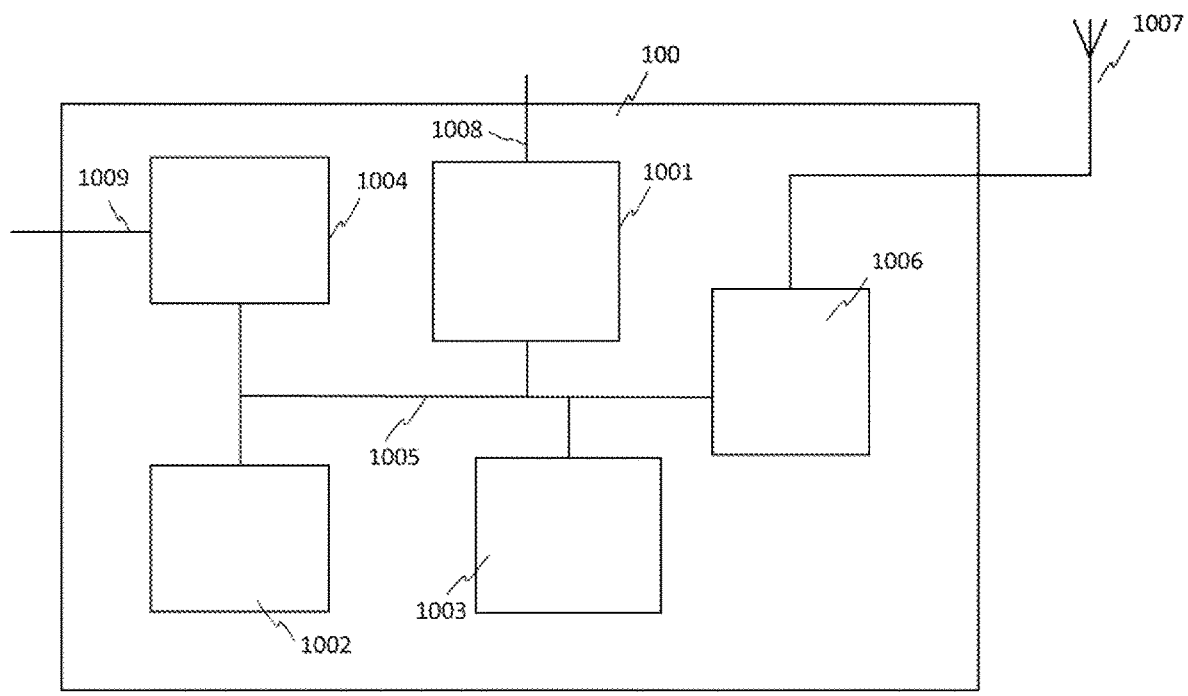

[Fig. 3]
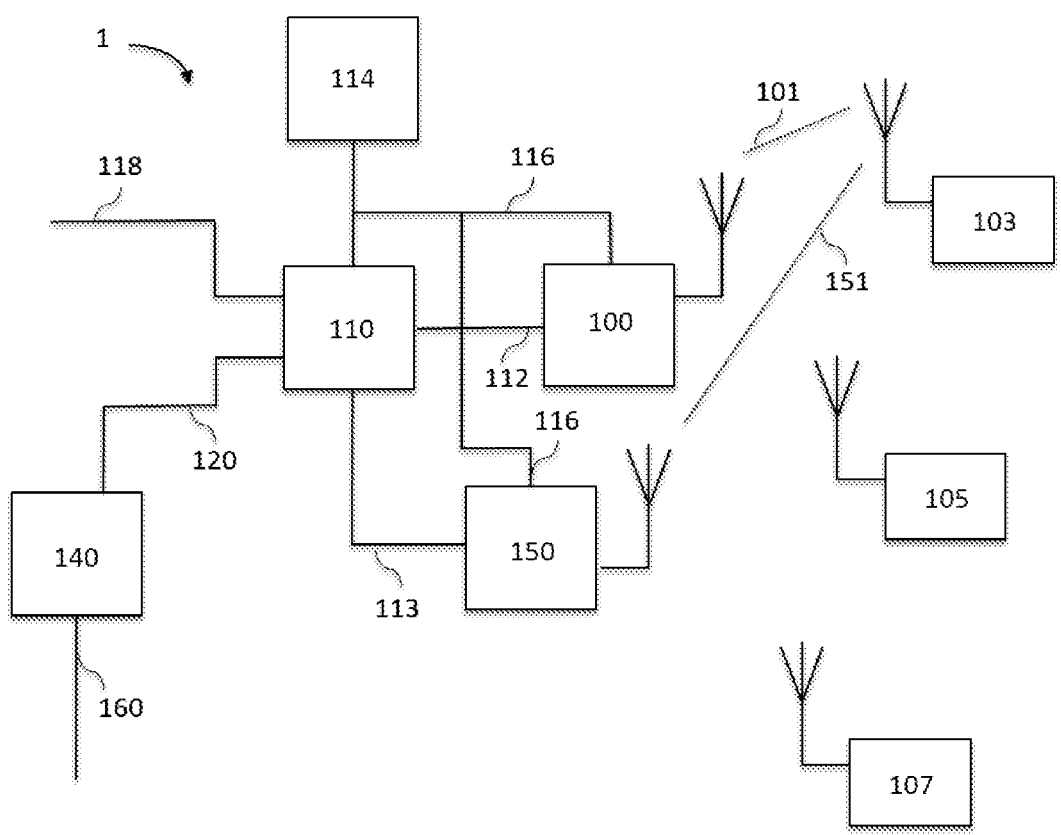

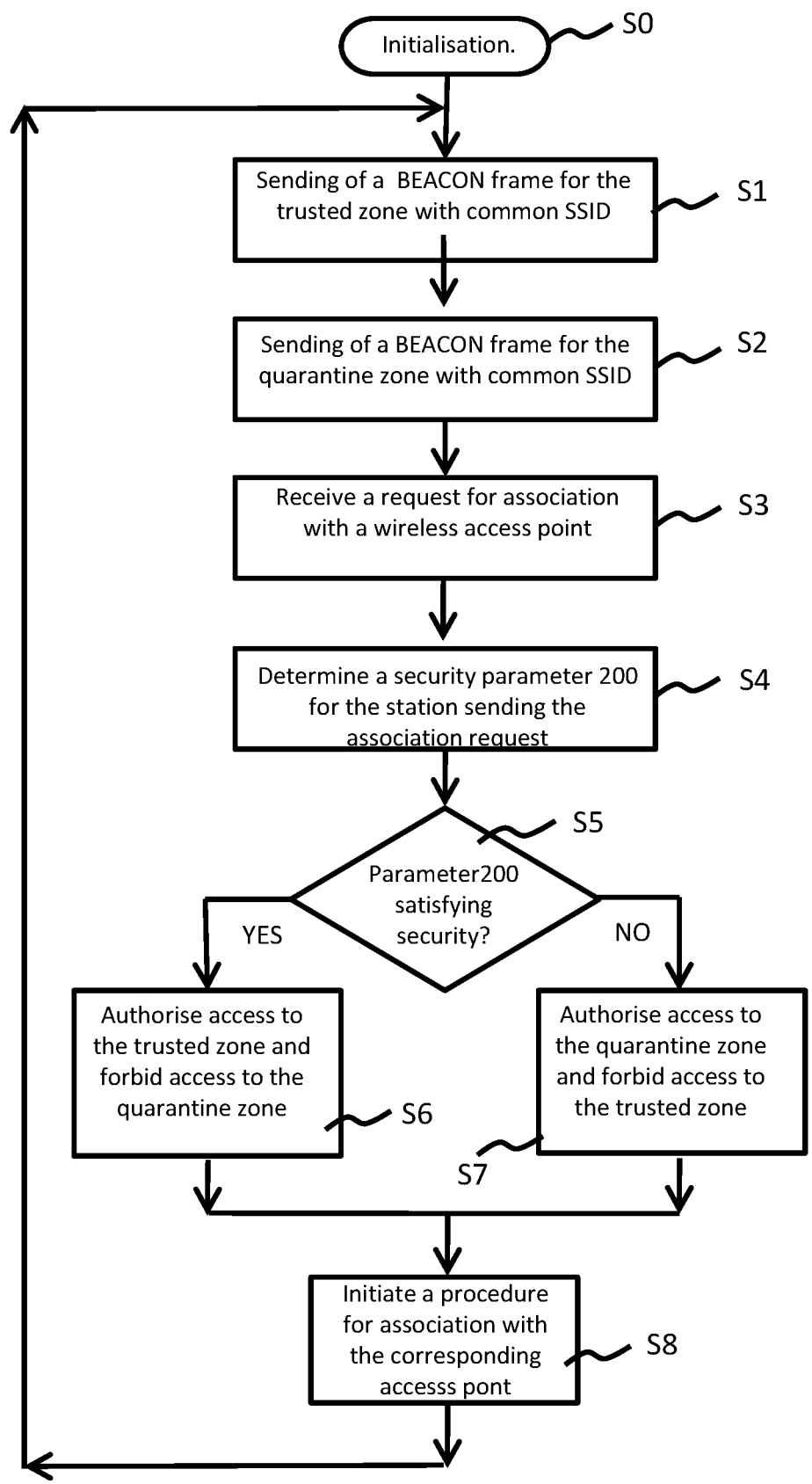

[Fig. 5]
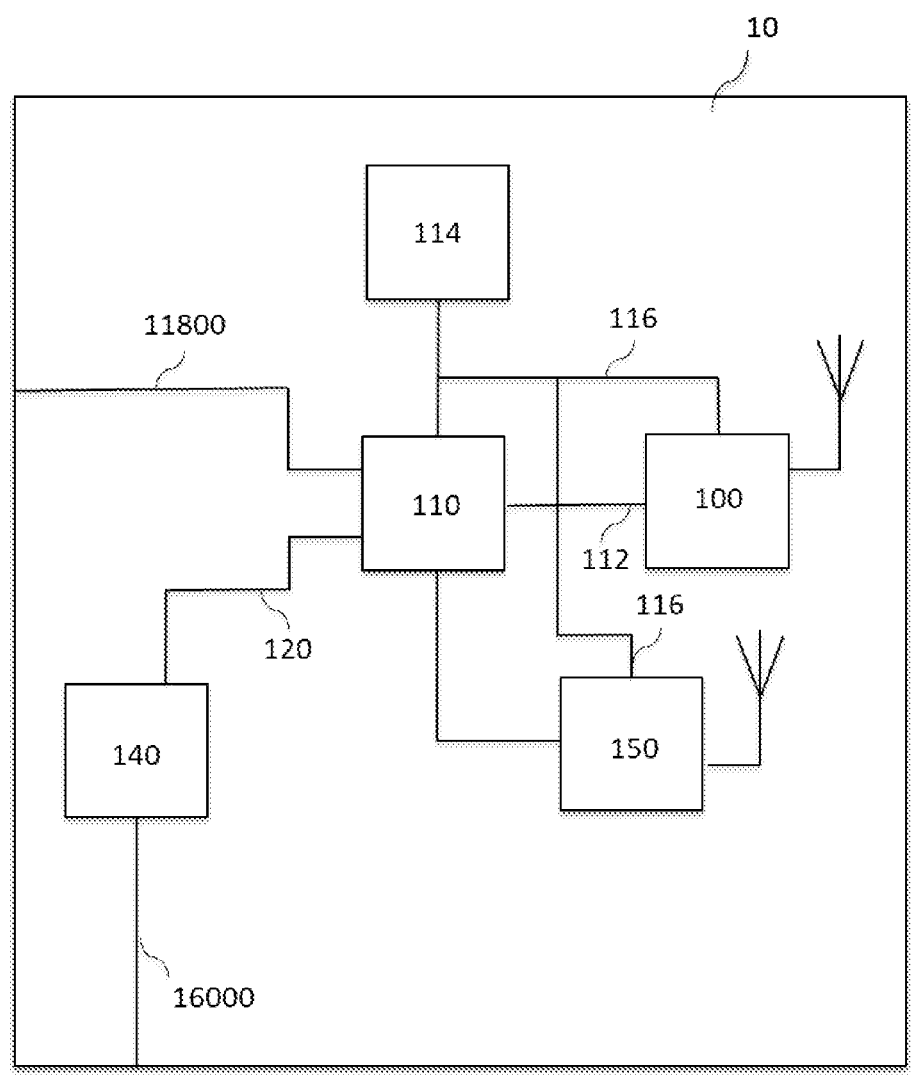

[Fig. 6]
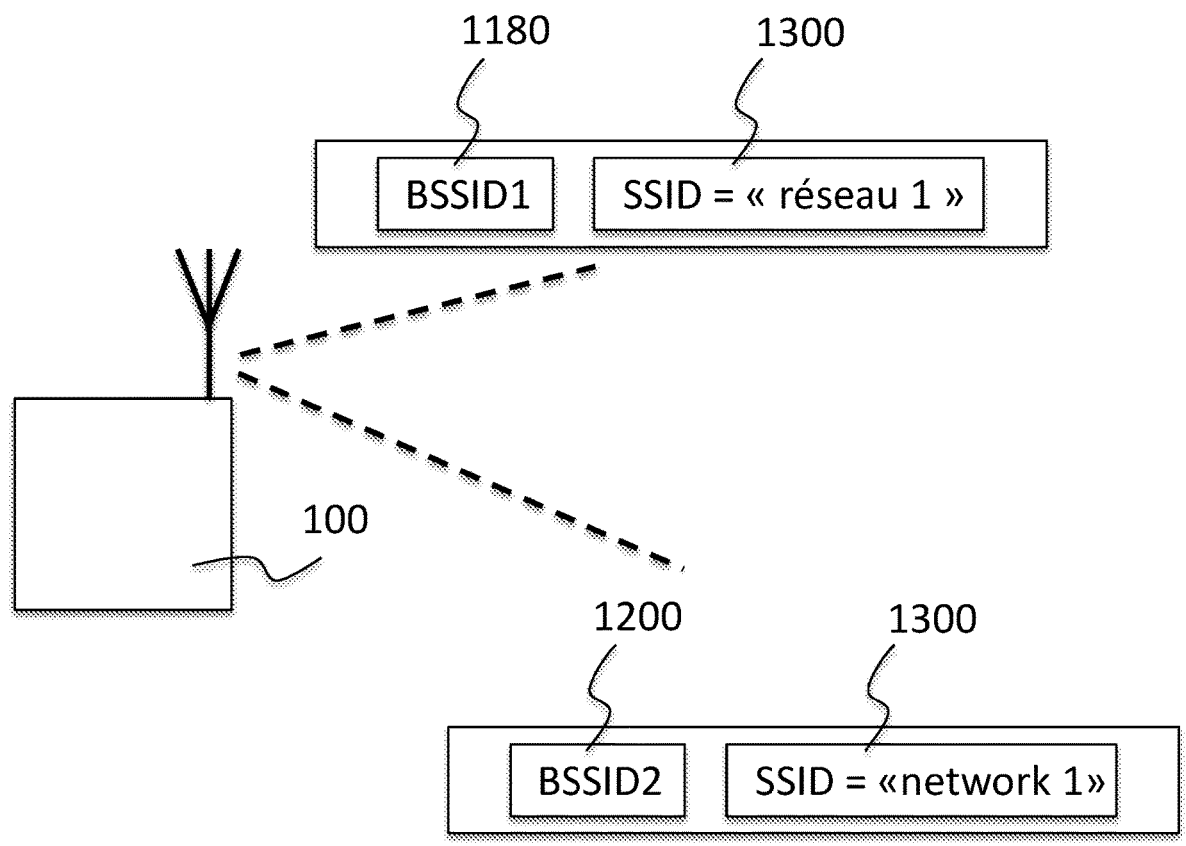

METHOD FOR SECURING ACCESSES TO A NETWORK, SYSTEM AND ASSOCIATED DEVICE

TECHNICAL FIELD

The present invention relates to the field of securing computer and communication networks. The invention relates more particularly to the isolation of a device connected via a wireless connection to a communication network and detected as performing one or more operations contrary to security rules applied in this network.

PRIOR ART

The increasing development of the Internet of Things is such that many objects connected to a local network, which must in addition often be easy to be connected and configured by an unskilled user, do not or only slightly satisfy information technology security requirements and may be subverted for performing attacks or intrusions on a computer network or a communication network.

One widespread attack is distributed service denial. This is an attack by means of which numerous systems connected to the same network are compromised and used in combination to attack the same target, in order to overwhelm the resources necessary for the correct functioning of this target and consequently to block or limit use thereof.

Another known attack consists, for example, of using passwords defined by default when the equipment was manufactured, in order to attempt to connect to this equipment and to reconfigure it.

The document US 2018/109492 describes a method for isolating a node in a network making it possible to re-route traffic visible to this node to a server, with a view to analysis and automated learning aimed at forming a behavioural model. In the case of an object connected via a wireless link, the document describes the establishment of an isolated network a termination of which can be identified by a unique service identifier SSID (service set identifier) that it is necessary to give in a step of configuration of the object. This technique of isolating and analysing node equipment in a network appears complex.

The patent application WO 2019/084340 A1 relates to a system and a method for providing a secure VLAN (virtual local area network) in a wireless network, making it possible to provide segregation of the network traffic, and to define priorities, for example in relation to a quality of service sought.

DISCLOSURE OF THE INVENTION

The present invention aims in particular to secure a computer network or a communication network by isolating, in a delimited zone of the network, referred to as a "quarantine zone", equipment connected via a wireless interface having previously been identified as presenting risks for the security of this network.

The words "security of a network" mean here the uses aimed at guaranteeing normal availability of the services offered by the devices that form the network and preserving the integrity of the data stored in these devices, as well as the confidentiality thereof, where applicable.

For this purpose, the object of the invention is to propose a method for securing accesses to a network executed by a securing device comprising at least one wireless connection device of the type consisting of an access point to the network and a data-frame routing device, the network comprising a first sub-network referred to as a "trusted zone" and a second sub-network referred to as a "quarantine zone", the routing device being configured so that a station connected to the network by association with the wireless connection device by means of a first sub-network identifier can access third-party devices connected in the trusted zone, and so that a station connected to the network by association with the wireless connection device by means of a second sub-network identifier cannot access third-party devices connected in the trusted zone and can access third-party devices connected in the quarantine zone, the method comprising:

sending, by the wireless connection device, an information frame of the beacon type comprising a network identifier of the SSID (service set identifier) type common to the trusted zone and to the quarantine zone, receiving, by the wireless connection device, a join request sent by a station, the request comprising the network identifier SSID common to the trusted zone and to the quarantine zone, determining, by an access controller, a parameter representing accesses made in said network by the station sending the join request, conditionally granting, by the access controller, to the station sending the join request, an authorisation to access the trusted zone, via the wireless connection device according to said parameter, and, in the case of refusal of access to the trusted zone, granting, to said station, authorisation to access the quarantine zone.

Advantageously, it is thus possible to isolate a device identified as not meeting the security requirements defined for the network, in a quarantine zone of the network, excluded from the so-called trusted zone. The device identified as not meeting the security requirements will, for example, be able to access a wide-area network, such as the internet, but will not be able to access a secure local network. According to this example, access to the internet is made possible via the quarantine zone.

Another advantage is that it is possible to give access to the internet to a "new" station, after a first connection to the communication network, and then to give it access to the local network subsequently, without having to reconfigure this station.

The method according to the invention may also comprise the following features, considered alone or in combination:

The first and second sub-network identifiers are identifiers of all the basic services (BSSID, "basic service set identifier") preferentially implemented in the form of MAC ("medium access control") addresses within the meaning of IEEE 802.11 or one of the revisions thereof.

The securing method uses a second wireless connection device of the type consisting of an access point to said network, the first and second network identifiers being respectively BSSIDs or MAC address identifiers of the wireless connection device and of the second wireless connection device, and the authorisation to access the quarantine zone is dependent on accesses made via the second wireless connection device for accessing a device in this zone.

The controller uses a list of identifiers (for example MAC addresses) of the stations authorised to effect accesses to the trusted zone or forbidden to access the trusted zone, according to the parameter determined.

The method comprises a step for disassociating a station from the wireless connection device, according to the parameter determined.

The method further comprises a step, in the case of refusal of access to the trusted zone, for a station, for isolating this station by prohibiting it from accessing the quarantine zone, and authorising it to access a third sub-network identifiable by this station by means of the common SSID network identifier.

Another object of the invention is to propose a securing device for securing access to a network comprising at least one wireless connection device of the type consisting of an access point to said network and a data-frame routing device, the securing device comprising a first interface for connection to a first sub-network referred to as a "trusted zone" of the network, a second interface for connection to a second sub-network referred to as a "quarantine zone" of the network, and a routing device configured so that a station connected to the network by association with the wireless connection device by means of a first sub-network identifier can access third-party devices connected in the trusted zone, and so that a station connected to the network by association with the wireless connection device by means of a second sub-network identifier cannot access third-party devices connected in the trusted zone and can access third-party devices connected in the quarantine zone, the device for securing access comprising:

- a transmitter configured for sending, by the wireless connection device, an information frame (of the beacon frame type, for example) comprising a network identifier of the SSID type, common to the trusted zone and to the quarantine zone,
- a receiver configured for receiving, by the wireless connection device, a join request sent by a station, the request comprising the network identifier SSID common to the trusted zone and to the quarantine zone,
- an access controller configured for determining a parameter representing accesses made in said network by the station sending the join request and for conditionally granting, to the station sending the join request, an authorisation to access, via the wireless connection device according to said parameter, and, in the case of refusal of access to the trusted zone, granting to this station authorisation to access the quarantine zone.

The device for securing access may furthermore be configured to implement access gateway functions between a wide-area network and a local network, and be what is commonly referred to as a "network gateway" or "gateway".

BRIEF DESCRIPTION OF THE DRAWINGS

The features of the invention mentioned above, as well as others, will emerge more clearly from the reading of the following description of at least one example embodiment, said description being made in relation to the accompanying drawings, among which:

FIG. 1 illustrates a communication network wherein a securing method is executed in a device for securing access, according to a particular and non-limitative embodiment of the invention.

FIG. 2 is a schematic representation of the architecture of a wireless connection device of the access point type used by the method in the device for securing access.

FIG. 3 illustrates a variant of the communication network already shown in FIG. 1 using a second wireless connection device of the access point type.

FIG. 4 is a flow diagram illustrating steps of the securing method according to the invention.

FIG. 5 is a schematic representation of a device for securing access according to a particular and non-limitative embodiment of the invention.

FIG. 6 is a schematic representation of a sending of information frames for two sub-networks, by a single wireless connection device, in order to offer a connection to two sub-networks each presented by means of a common SSID network identifier.

DETAILED DISCLOSURE OF EMBODIMENTS

FIG. 1 illustrates schematically a computer network 1, also referred to as a communication network 1, comprising devices connected to the communication network 1 by a cabled connection and devices connected to the communication network 1 by wireless connection. The communication network 1 comprises a wireless connection device 100 (also commonly referred to as an access point) enabling a fixed or mobile station compatible with the wireless connection device 100 to connect to the communication network 1 via an antenna system. Stations 103, 105 and 107 are configured to be able to connect, via a wireless link, to the communication network 1 by means of the wireless connection device 100. The communication network 1 comprises a first local sub-network 118 and a second local sub-network 120. Each of the sub-networks 118 and 120 comprises devices connected to other devices by cabled or wireless connections (not shown in the figure). The sub-networks 118 and 120 are connected by a routing device 110, also referred to as a "router", which is also connected to the wireless connection device 100. An interconnection device 140 is configured to interconnect the local sub-network 120 to a wide-area network 160. The interconnection device 140 is configured to establish a communication bridge. The wide-area network 160 comprises a connection to the extended internet. An access controller 114 is connected to the routing device 110 and to the wireless connection device 100. The access controller 114 is adapted for configuring and supervising the routing device 110 and the wireless connection device 100. The wireless connection device 100 is connected to the access controller 114 by means of a control bus 116 and to the routing device 100 by means of a network link 112.

The communication network 1 is adapted for transmitting data between the stations 103, 105 and 107 with the various devices connected to the sub-networks 118 and 120 as well as to the wide-area network 160.

Advantageously, and according to the invention, the communication network 1 comprises a zone referred to as the "trusted zone" and a zone referred to as the "quarantine zone". According to the preferred embodiment of the invention, the trusted zone is the sub-network 118, which is a private local network, and the quarantine zone is the sub-network 120, which is a local network connected to the wide-area network 160 through the bridge-type interconnection device 140.

To do this, the routing device 110 is configured so that a station among the stations 103, 105 and 107, connected to the communication network 1 by association with the wireless connection device 100 by means of the first network identifier 1180, can access third-party devices connected in the trusted zone, and so that a station among the stations 103, 105 and 107, connected to the network 1 by association with the wireless connection device 100 by means of a second network identifier 1200, cannot access third-party devices connected in the trusted zone 118 and can access third-party devices connected in the quarantine zone 120.

To do this, the routing device 110 uses a filtering on IP (Internet Protocol) addresses distributed by one or more DHCP servers when a device is connected to the communication network 1.

The network identifier 1180 identifies the so-called "trusted zone" sub-network 118 and the identifier 1200 identifies the so-called "quarantine zone" sub-network 120. These identifiers are for example identifiers of sets of services commonly referred to as BSSID within the meaning of IEEE 802.11 or any one of the revisions thereof. These BSSIDs are preferentially implemented in the form of MAC addresses, still within the meaning of IEEE 802.11 or any of the revisions thereof.

The method according to the invention cleverly makes it possible to present the sub-network 118, that is to say the trusted zone, and the sub-network 120, that is to say the quarantine zone, as two offers of network services identifiable via a common SSID identifier 1300, by a mobile station disposed within range of the wireless connection device 100. The common identifier is preferentially of the SSID type within the meaning of IEEE 802.11 or any one of the revisions thereof. According to one embodiment of the invention, the wireless connection device 100 sends network information frames that aim to inform a fixed or mobile station of the presence of a device for connection to a network and of the presence of offers of network services accessible via a wireless connection. The information frames comprise, among other information, an identifier of the network to which it is possible to connect such as for example an MAC address of a wireless connection device or a connection port identifier, as well as an identifier of the network seen by a station, that is to say an SSID for example. Thus, by means of the execution of the method according to the invention, a mobile station among the stations 103, 105 and 107, configured for a connection to an offer of network service corresponding to the common SSID identifier 1300, is able to seek a connection to the trusted zone 118 or to the quarantine zone 120, according to other parameters. The method according to the invention uses a parameter 200 representing accesses made in the communication network 1 by each of the stations 103, 105 and 107 potentially senders of a request in association with the wireless connection device. The words "parameter representing accesses made in a network" are to be interpreted here as a categorisation of the behaviour of a station among stations 103, 105 and 107, in terms of accesses made on the communication network 1, when it is connected or has been connected to the communication network 1. For example, the parameter 200 may take a value representing compliance or non-compliance with security rules or behaviour defined and satisfying a security level sought in the communication network 1. The security rules are for example defined by an administrator of the communication network 1 and may be modified over time. According to another example, the security rules may be standardised and established by specialists in computer network security, based on previously observed attacks. Thus, according to a first example, a value 0 of the parameter 200 indicates that the corresponding station does not satisfy the security rules defined for the communication network 1, and a value 1 of the parameter 200 indicates that the station does satisfy the security rules defined for the communication network 1. Compliance with the security rules may be evaluated by the absence of accesses in breach of the rules defined. The security rules defined may change over time, so that a station judged to be in compliance with the security rules is non-complying, and vice versa. If, for example, a station performs repeated operations of attempts at connection to a configuration port of a device in the network normally accessible to a user having privileges of administrator of the communication network 1, it is considered that the station is infringing a security rule and that this station is consequently not in compliance with the security rules defined in the communication network 1. According to another example, if a station accesses the same remote machine identified by its IP address, in a way that is very regularly repeated, and with a repetition profile that lets it be believed that it could be a case of a denial of service attack, there also the parameter representing accesses made is determined so as to indicate that the station does not satisfy the security requirements required for the communication network 1. According to yet another example, the parameter may take a value from among around ten values, for example (one mark out of ten, or an index), calculated with respect to a plurality of combined criteria, and define a level of conformity with the security requirements defined for the communication network 1, or a level of breach of the security requirements or a risk level vis-à-vis other devices connected to the communication network 1 and data that they respectively contain. The parameter 200 thus defined therefore makes it possible to evaluate the danger represented by a station connected to the communication network 1 for the other devices connected to the communication network 1 and for the integrity or confidentiality of the data that are stored therein. The parameter 200 representing accesses made thus constitutes a security index that can be obtained by comparing accesses made by the corresponding station with standard accesses defined in accordance with a catalogue of accesses the type and/or the spatial or temporal distribution of which are judged to be "illegal" within the communication network 1. A parameter 200 representing accesses made is determined for each of the stations 103, 105 and 107. The parameter 200 is determined under the control of the access controller 114 which, for this purpose, scrutinises all the data packets passing through the routing device 110, coming from or going to the wireless connection device 100. The data packets that pass are analysed in detail so as to define, for each of the packets, the origin and destination thereof and whether the content is correlated with an access type referenced in the catalogue of accesses judged to be illegal with regard to the security rules defined for the communication network 1.

Advantageously, and according to the securing method according to the invention, when a station among the stations 103, 105 and 107 has a parameter 200 representing accesses made that is not in compliance with the security rules defined, the station is put in quarantine by prohibition on connecting to the trusted zone 118 and authorisation to connect to the quarantine zone 120. Advantageously, all the mobile or fixed stations that have a parameter 200 representing accesses made that is not in compliance with the security rules defined for the communication network 1 are put in quarantine and all the mobile or fixed stations that have a parameter representing accesses made that is not in compliance with the security rules defined for the communication network 1 are automatically connected to the trusted zone, so as to isolate the devices not in compliance with the security rules from the devices in compliance with the security rules. According to the preferred embodiment of the invention, the authorisation to connect to the quarantine zone 120 and the prohibition on connecting to the trusted zone 118, or vice versa, are implemented by filtering performed on identifiers of the stations, such as the MAC (medium access control) address, for example. Thus, the access controller 114 preferentially uses a table of MAC addresses authorised or MAC addresses prohibited for each of the trusted zone 118 and quarantine zone 120. When a station is not yet known to the access controller 114 and therefore the behaviour thereof on the network has not been evaluated, in terms of compliance with the security rules defined, this station is initially considered to be non-compliant with the security rules. According to the preferred embodiment, in the absence of accesses made identified as illegal during a predetermined period of time as from its first connection to the communication network 1, the station is considered to be in compliance with the security rules defined for the communication network 1. Thus a station not yet known to the communication network 1 can connect only to the quarantine zone for its first connection to the communication network 1, and the access controller 114 will next, at the end of an evaluation period, authorise it to connect to the trusted zone 118, in the case where the accesses made by this station satisfy the security rules defined. A description will be given below of a sequence of connection of the mobile station 103 not yet known to the communication network 1, followed by a quarantining of this station by automatic connection to the quarantine zone 120, and then by an automatic connection of the station to the trusted zone 118 and finally by a corruption of the integrity of the station 103 with regard to the security rules in force in the communication network 1 and by a quarantining of the station 103 by automatic connection of the station 103 to the quarantine zone 120.

Such a sequence is initiated by the sending, by the wireless connection device 100, of information frames 200 comprising an SSID identifier 1300 common to the trusted zone 118 and to the quarantine zone 120. This information frame is for example a beacon frame as defined in 802.11 or any one of the amendments thereof. The beacon information frames sent are received by the station 103, which identifies the offers of services corresponding to the trusted zone 118 and to the quarantine zone 120, said offers both being identifiable by means of the same common SSID identifier. For example, the SSID of the beacon information frames for the trusted zone is "network 1" and the SSID of the beacon information frames for the quarantine zone is "network 1" also. In other words, the quarantine zone is a clone of the trusted zone seen from the mobile station 103. The mobile station 103, configured to connect to a network identified by the identifier "network 1", sends a frame, in response to a beacon information frame, aimed at seeking an association with the wireless connection device 100, with a view to a connection to the network identified by the identifier "network 1". This frame comprises a request for association with the wireless connection device 100 for connection to the network entitled "network 1". This frame furthermore comprises the MAC address of the station 103. On reception of this frame, the wireless connection device 100 sends a copy of the frame to the access controller 114. The access controller 114 makes a comparison of the MAC address of the station 103 and finds that this station has never been connected to the communication network 1. Since it has not been possible to previously qualify the behaviour of the station 103 with regard to the security rules defined for the communication network 1, the mobile station 103 is then identified by the access controller 114 as not being in compliance with the security rules, its parameter 200 representing accesses made is determined accordingly, and its MAC address is entered in a list of MAC addresses forbidden to connect to the trusted zone 118 by means of the routing device 110. According to a similar reasoning, the MAC address of the mobile station 103 is not entered in a list of MAC addresses forbidden to connect to the quarantine zone 120. If the request for joining the network "network 1" sent from the mobile station 103 to the remote connection device 100 was sent in response to a beacon information frame corresponding to the trusted zone 118, the join request comprises an identifier (a joining port number, for example) of the trusted zone 118 and the wireless connection device 100 interprets the request to join the "network 1" as a request to join the trusted zone 118. The wireless connection device then rejects the join request since the MAC address of the station 103 that sent the join request is entered in the list of MAC addresses forbidden to connect to the trusted zone 118. Refusal is thus made by means of a filtering of MAC addresses. The wireless connection device 100 then notifies the mobile station 103 of a refusal to join the latter and the station 103 reiterates the sending of a join request in response to the reception of a beacon information frame comprising the "network 1" SSID. When the mobile station 103 sends a join request in response to a beacon information frame making reference to "network 1" but comprising an identifier (a joining port number for example) of the quarantine zone, which occurs because of the probability laws, the wireless connection device 100 will accept the joining since the MAC address of the mobile station 103 is entered in the list of MAC addresses authorised to connect to the quarantine zone 120 or is not entered in the list of MAC addresses forbidden to access the quarantine zone 120. According to the invention, as many beacon information frames comprising the common identifier "network 1" and an identifier of the trusted zone as there are beacon information frames comprising the common identifier "network 1" and an identifier of the quarantine zone are sent, so that the probability that the mobile station 103 responds to an information frame corresponding to the quarantine zone 120 is very high, and the mobile station 103 sends a join request to the "network 1" corresponding to the quarantine zone 120 within a short time. As soon as the mobile station 103 is connected to the quarantine zone 120 of the communication network seen as "network 1", it interacts with devices connected to the communication network 1 in the quarantine zone 120. It can for example connect to remote devices through the internet. The mobile station 103, thus connected, cannot interact with devices connected in the trusted zone 118 since the routing device 110 is configured to isolate the trusted zone 118 and the quarantine zone 120. During the accesses made, the access controller 114 analyses the data packets that pass between the mobile station 103 and devices in the quarantine zone 120 and determines or updates the parameter 200 representing accesses made by the mobile station 103 in the quarantine zone 120. At the end of an observation and qualification period of a predetermined duration, the access controller 114 determines, in the absence of accesses deemed to be illegal with regard to the security rules defined, that the mobile station 103 is in compliance with the security rules. The access controller then removes the MAC address of the mobile station 103 from the list of addresses forbidden to access the trusted zone 118 and enters the MAC address of the mobile station 103 in the list of addresses forbidden to connect to the quarantine zone 120. After this updating of the lists of MAC addresses useful to the filtering by MAC address, the wireless connection device 100 performs, under the control of the access controller 114, a (forced) disassociation of the mobile station 103 and of the wireless connection device 100. The wireless connection device 100 thus forces a disconnection of the mobile station 103 from the communication network 1 and more precisely from the quarantine zone 120. The mobile station 103 thus disconnected then makes attempts at reconnecting to the "network 1" for which beacon information frames are still being broadcast regularly, comprising the "network 1" SSID common for the trusted zone 118 and for the quarantine zone 120. According to the same probability scheme as described above, the mobile station, within a brief period of time, sends a join request to the wireless connection device 100 with a view to association with the "network 1" and in response to a beacon information frame comprising the network identifier 1180 of the trusted zone 118 (a BSSID in the form of an MAC address for example). The mobile station 103 is then granted connection to the trusted zone 118 by means of the wireless connection device 100, on the basis of an MAC address filtering performed following the updating of the lists of prohibited MAC addresses. The mobile station 103 is authorised to connect to the trusted zone 118 and to gain access therein until the access controller 114 detects, where applicable, one or more accesses judged to be illegal with regard to the security rules defined in the communication network 1. In the case where the access controller 114 detects one or more accesses judged to be illegal and of such a nature as to impact on the parameter representing accesses made and to then consider the mobile station 103 as having become non-compliant with the security rules defined in the communication network 1, the access controller 114 performs a new updating of the lists of filtering MAC addresses, so as to authorise the mobile station 103 to connect to the quarantine zone 120 and to forbid it to connect to the trusted zone 118. A new (forced) disassociation, initiated by the wireless connection device 100 under the control of the access controller 114, then causes an automatic connection of the mobile station 103 to the quarantine zone 120.

Advantageously, if the mobile station 103 the behaviour of which in terms of access to the communication network 1 is corrupted, for example because of an insertion of malevolent software, such as a virus, or because of a use not complying with the security rules, this mobile station 103 is automatically put in quarantine by connection to the quarantine zone 120 of the communication network 1, and isolated from the trusted zone 118 of the communication network 1, without requiring any modification of the configuration of the mobile station 1 or of the wireless connection device 100. The only modification required in the communication network 1 being the updating of the MAC address tables corresponding to lists of authorised or prohibited addresses, respectively associated with one or other of the sub-networks of the communication network 1 that are the trusted zone 118 and the quarantine zone 120.

Such a configuration illustrates clearly the ability to isolate, by means of the implementation of the method according to the invention, devices connected to the quarantine zone 120 from devices connected to the trusted zone 118. This configuration is however not to be interpreted limitatively and, obviously, according to a variant of the embodiment of the invention, the trusted zone 118 can also have available an access to the wide-area network 160 through the interconnection device 140, and consequently also have, for example, an internet access via the wide-area network 160.

FIG. 2 illustrates the internal architecture of the wireless connection device 100 used in the communication network 1 by the securing method previously described. The wireless connection device 100 comprises a control unit 1001, a non-volatile memory 1002 for storing configuration parameters and executable software codes, a volatile memory module 1003 for executing software codes executable by the control unit 1001, and a radio-wave communication interface 1006 coupled to an antenna system 1007. The communication interface 1006 and the antenna system 1007 are preferentially compatible with the wireless communication standard IEEE 802.11 and the amendments /a, /b, /g, /n, /ac and /ax thereof. The wireless connection device 100 further comprises an interface 1009 adapted to a connection to a cabled communication network of the Ethernet type. According to a variant of the embodiment, the interface 1009 may be of the wireless type. The interface 1009 for connection to a communication network is in particular configurable for a connection to the routing device 110 of the communication network 1, via a connection bus 1009, and allows the transfer of data from and to the communication network 1 (via the routing device 110) and from and to the communication interface by radio waves 1006. These internal modules of the connection device 100 are connected together by a common control/command/data bus 1005, managed by the control unit 1001. The control unit 1001 further comprises a connection port 1008 for connection to an external access controller. This connection port 1008 is a configuration port adapted to the control of the wireless connection device 100 by the access controller 114. Thus the access controller 114 can configure the wireless connection device 100, and in particular define parameters of the wireless connection device 100 such as the SSID identifier "network 1" of the trusted zone, the SSID identifier "network 1" of the quarantine zone (identical to that of the trusted zone), the periodicity of sending of the beacon information frames, as well as many other parameters. The functioning of the wireless connection device 100 is not described here any further since it is not useful to an understanding of the invention.

FIG. 3 illustrates schematically the communication network 1 according to a variant of the embodiment of the invention. According to this variant, the communication network 1 comprises a second wireless connection device 150 similar to the wireless connection device 100. The wireless connection device 150 is connected to the access controller 114 by means of the control bus 116 and to the routing device 100 by means of a network link 113. Thus, the mobile stations 103, 105 and 107 can possibly connect to the wireless connection device 100 or to the wireless connection device 150. The figure describes a possible wireless connection link 101 between the mobile station 103 and the wireless connection device 100 or a possible wireless connection link 151 between the mobile station 103 and the wireless connection device 150, by way of examples.

According to this variant of the embodiment, the SSIDs respectively associated with the trusted zone 118 and with the quarantine zone 120 are not sent by the same wireless connection device, but by two distinct wireless connection devices, namely the wireless connection devices 100 and 150.

Thus, for example, the sending of the common SSID "network 1" 1300 by the wireless connection device 100 corresponds to an offer of network services corresponding to a possible connection to the trusted zone 118 and the sending of the common SSID "network 1" 1300 by the wireless connection device 150 corresponds to an offer of network service corresponding to a possible connection to the quarantine zone 120 of the communication network 1. The sub-network identifier 1180 of the trusted zone 118 may be the MAC address of the wireless connection device 100 and the sub-network identifier 1200 of the quarantine zone may be the MAC address of the wireless connection device 150. According to this variant, the routing device 100 is configured to transmit the data packets coming from and going to the wireless connection device 100 to and from the trusted zone 118 and the data packets coming from and going to the wireless connection device 150 to and from the quarantine zone 120. Advantageously, this makes it possible to obtain a physical isolation of the trusted zone and of the quarantine zone, in addition to the logic isolation of the data packets that are passing. Still according to this variant, each of the wireless connection devices 100 and 150 may be associated with a list of MAC addresses forbidden to connect, in accordance with the previously described method. Thus, and considering the examples of automatic connection and disconnection previously described, a station such as, for example, the mobile station 103, is able to connect only to the zone for which it does not appear in the list of MAC addresses forbidden to connect. The lists of MAC addresses forbidden to connect for the trusted zone 118 and the quarantine zone 120 being updated under the control of the access controller 114, from the observations made on the communication network 1 and in particular on the detection of accesses judged to be illegal with regard to the security rules defined in the communication network 1.

FIG. 4 is a flow diagram showing the principle of the method for securing the communication network 1 according to a particular and non-limitative embodiment of the invention and according to the network architecture described in FIG. 3. When the various devices that form the communication network 1 are normally operational, the securing method can be executed. This is the case at the end of an initialisation step S0. The wireless connection device 100 is configured as a wireless access point to the trusted zone 118 and the wireless connection device 150 is configured as a wireless access point to the quarantine zone 120. The routing device 110 is configured to isolate the trusted zone 118 from the quarantine zone 120. According to a variant of the embodiment, the routing device 110 is not used, the trusted zone is directly connected to the wireless connection device 100 and the quarantine zone 120 is directly connected to the wireless connection device 150.

The wireless connection device 100, in a step S1, sends an information frame, also referred to as a beacon frame, to devices compatible with the wireless connection modes offered and present within range of the wireless connection device 100. The beacon information frame comprises the MAC address of the wireless connection device 100 operating as an identifier of the trusted zone 118 of the communication network 1. The beacon information frame further comprises an identifier of an offer of network services of the SSID type, describing the presence of the communication network 1. The SSID transmitted is, according to the example chosen, "network 1". In the same way, the wireless connection device 150, in a step S2, sends another information frame, a beacon frame, to devices compatible with the wireless connection modes offered and present within the range of the wireless connection device 150. This other beacon information frame comprises the MAC address of the wireless connection device 150 operating as an identifier of the quarantine zone 120 of the communication network 1. This beacon information frame further comprises an identifier of an offer of network services of the SSID type, describing the presence of the communication network 1. The SSID transmitted is cleverly the same as that sent by the wireless connection device 100, that is to say, "network 1". It is considered that the SSID sent by the wireless connection device 150 clones the SSID sent by the wireless connection device 100. It should be noted that, if a wireless connection device (100 or 150) uses a plurality of radio-wave transmission/reception modules, the SSID is cloned according to the current management of the SSID by the wireless connection device. In other words, if the wireless connection device uses an SSID for n transmission/reception modules, then the SSID will be cloned on the n transmission/reception modules, and if the wireless connection device uses a different SSID per transmission/reception module, then the SSID particular to each of the transmission/reception modules will be cloned on this transmission/reception module.

The mobile station 103 receives the beacon information frames and detects the presence of a communication network entitled "network 1". This mobile station 103 can thus be configured to connect to the network presented under the title "network 1" by the SSIDs respectively transmitted by the two wireless connection devices 100 and 150. The mobile station then, in a step S3, sends a frame comprising a join request in response to a beacon information frame received, either from the wireless connection device 100, or from the wireless connection device 150. This frame, sent by the mobile station 103, is transferred to the controller 114, which detects, for example, that the MAC address of the mobile station 103 is not known to the communication network 1, and that this station has not previously been connected to the communication network 1. Thus, in a step S4, a security parameter 200 representing accesses made on the network is determined. According to this example, the parameter is determined so as to indicate, in a step S5, that the mobile station 3 is not compliant with the security rules defined for the communication network 1. In this case, the mobile station 103 is authorised to access the quarantine zone 120 of the communication network 1 and prohibited from accessing the trusted zone 118 of the communication network 1. The prohibition on accessing the trusted zone 118 is done by entering the MAC address of the mobile station 103 in the list of MAC addresses forbidden to access this zone. The authorisation to access the quarantine zone 120 is implemented by, where applicable, removing the MAC address of the mobile station 103 from the list of MAC addresses forbidden to access the quarantine zone 120, the whole being under the control of the access controller 114. Thus the connection device (100 or 150) that received the frame comprising a join request coming from the mobile station 103 accepts or refuses the joining, that is to say in other words the connection, by performing an MAC-address filtering, by comparing the MAC address of the mobile station 103 with the list of MAC addresses forbidden to connect. This filtering, with a view to authorising or not the joining, is performed in a step S8 of initiating a procedure of association between the mobile station 103 and the wireless connection device concerned. If the association is initiated with the wireless connection device 110, possibly allowing a connection to the trusted zone 118, the join request is rejected since the mobile station 103 is identified as being non-compliant with the security rules defined in the communication network 1. The mobile station 103 then makes one or more new attempts at connection to the "network 1" until a frame comprising a join request is sent in response to a beacon information frame coming from the wireless connection device 150, during a future iteration of the loop described by the steps S1 to S8, via S6 or S7, according to the compliance or non-compliance of the mobile station 103 with the security rules defined. When the mobile station 103 sends a join request in response to a beacon information frame sent by the wireless connection device 105, this device will accept proceeding with an association since the MAC address of the mobile station 103 does not appear in the list of MAC addresses forbidden to connect to the quarantine zone 120. The mobile station 103, non-compliant with the security rules defined, is thus cleverly connected automatically to the quarantine zone 120 of the communication network 1. The loop described by the steps S1 to S8, via the step S6 or the step S7, is repeated continuously, so that beacon information frames are sent recurrently and so that the parameter representing the accesses made by the mobile station 103 on the communication network 1 can be determined periodically, that is to say, in other words, can be updated according to the nature of the accesses made on the quarantine zone. Thus, if for example, at the end of an observation period of a predetermined duration, the mobile station 103 has not made an access able to be judged illegal within the meaning of the security rules defined, the access controller 114 will determine a new value of its parameter 200 representing accesses made so as to consider the mobile station 103 as being compliant with the security rules defined. Thus, at a next iteration of the step S5, the mobile station 103 is judged as having a behaviour compliant with security and authorised to access the trusted zone 118, and consequently forbidden to access the quarantine zone 120. These modifications being made under the control of the access controller 114, which continuously monitors the accesses made from and to the connected devices by means of a wireless connection, by scrutinising data packets that pass. Thus, after a new initiation of a procedure of association of the mobile station 103 with the wireless connection device 100, the mobile station 103 will be able to be connected automatically to the trusted zone 118 of the communication network 1. More generally, any modification of the parameter representing accesses made by a mobile station on the communication network 1 will give rise to a possible modification of its state of compliance with regard to the security rules defined and a possible updating of the list of MAC addresses forbidden to connect to the wireless connection devices 100 and 150.

Advantageously, it is thus possible to isolate devices connected via a wireless connection to the network, operating in compliance with the security rules defined, from those not operating or not guaranteeing to operate in compliance with these same rules.

All this being done without requiring any modification to the configuration of the network other than lists of MAC addresses authorised or forbidden to connect to the various wireless connection devices.

According to a preferred embodiment of the invention, the wireless connection devices 100 and 150, the routing device 110, the access controller 114 and the network interconnection device 140 are implemented in the same device 10 for securing access to the communication network 1, shown in FIG. 5.

FIG. 6 illustrates a sending of two beacon information frames from the wireless connection device 100. One of the beacon information frames comprises, among other information, the sub-network identifier BSSID1 1180, operating as an identifier of the trusted zone 118, and the common SSID 1300 that contains a string of characters "network 1". The trusted zone 118 is therefore presented to a station within range of the wireless connection device 100 by means of the common SSID "network 1" 1300. The other beacon information frame comprises, among other information, the sub-network identifier BSSID2 1200 operating as an identifier of the quarantine zone 120, and also comprises the common SSID 1300 that contains, similarly to the other frame, the character string "network 1". The quarantine zone 120 is therefore cleverly also presented to a station within range of the wireless connection device 100 by means of the common SSID "network 1". Advantageously, and by means of the use of the identifiers 1180 and 1200 in the form of identifiers of sets of BSSID services, it is possible to present the two sub-networks 118 and 120, to a station within range of the wireless connection device 100, by using a single wireless connection device, including if the latter comprises only one radio-wave communication interface. Thus, a station that wishes to connect to the communication network 1 identified by the common SSID "network 1" 1300 will find the trusted zone 118 or the quarantine zone 120, according to the parameter 200 defined for this station by the controller 114.

In the case where two wireless connection devices are used (100 and 150, for example), each may be associated with the corresponding sub-network by a BSSID, preferentially implemented in the form of a MAC address, or its native wireless connection device MAC address.

The device 10 may furthermore be configured to perform domestic-network gateway functions, such as those conventionally implemented by a "network gateway" or "gateway" device. According to this configuration, the device 10 is a network gateway between a wide-area network and a local network and it is possible, by means of the method according to the invention implemented in the device 10, to isolate for example a private local network (which then corresponds to the trusted zone 118), connected to an interface 11800 of the device 10, from a wide-area network (that is to say the wide-area network 160 connected to an interface 16000 of the device 10). A station connected to the device 10 according to the invention can then be isolated automatically from the private local network in the event of the detection, by the access controller 114 of the device 10, of one or more accesses liable to make it be believed that this station is cooperating with a software module of the malware type or of the computer virus type, or that this station is configured or used to make accesses of such a nature as to compromise the security of the communication network 1.

According to a variant, the communication network 1 comprises, apart from the trusted zone 118 and the quarantine zone 120, a third sub-network 122 dedicated to a remote connection provided for the purpose of performing maintenance operations on a mobile station detected as being non-compliant with the security rules defined for the communication network 1. An automatic connection to this third sub-network is then made, where applicable under the control of the access controller 114, by simultaneously entering the MAC address of the station concerned in the list of MAC addresses forbidden to connect to the trusted zone 118 and in the list of MAC addresses forbidden to connect to the quarantine zone 120, without however entering it in a list of MAC addresses forbidden to access this third sub-network 122 dedicated to the analysis and/or the remote maintenance of a station detected as being non-compliant with the security of the communication network. The method for automatic association with this network 122 is similar to the methods for automatic connection to the trusted zone 118 or to the quarantine zone 120 and is based on a criticality level preferentially defined using the parameter 200 representing accesses made on the communication network 1. According to one embodiment, the third sub-network is a VPN (virtual private network) implemented in the quarantine zone and enabling, for example, a station judged to be non-compliant with the security rules to be taken over by a specialist company, via the internet wide-area network.

Advantageously, the access controller 115 can generate the sending of automatic alert messages, by email to a user or an administrator of the communication network 1, for example, or by SMS to one or more pre-recorded telephone numbers.

Advantageously again, the access controller 114 may be configured and/or managed dynamically by an administrator of the network and by means of configuration registers or a high-level language describing security rules and/or types of access judged to be illegal with regard to the security of the communication network 1.

According to one embodiment of the invention, the parameter 200 of a station may be determined in whole or in part according to characteristics particular to the station, such as, for example, the OUI (Organisationally Unique Identifier) field of its MAC address, or according to characteristics such as options communicated by the station to a DHCP server when an IP address is attributed by the communication network 1. Advantageously, this makes it possible to supply information on the type of station to the access controller 114 and/or to a system administrator of the communication network 1.

According to one embodiment of the invention, an administrator of the network can configure the access controller 114 in order to force the connection to a station connected to the communication network 1 to the trusted zone 118 or to the quarantine zone 120.

The invention is not limited solely to the embodiments described above, but more broadly to any method for securing accesses to a communication network, at least one wireless connection device of the type consisting of an access point to said network and a data-frame routing device, the network comprising a first sub-network and a second sub-network, the routing device being configured so that a station connected to the network by association with the wireless connection device by means of a first network identifier can access third-party devices connected in the first sub-network, and so that a station connected to the network by association with the wireless connection device by means of a second network identifier cannot access third-party devices connected in the first sub-network and can access third-party devices connected in the second sub-network, the method being characterised in that it comprises steps of sending, by the wireless connection device, information frames comprising an SSID network identifier common to the first sub-network and to the second sub-network; receiving, by the wireless connection device, a join request sent by a station, the request comprising the SSID network identifier common to the first sub-network and to the second sub-network; determining, by an access controller, a parameter representing accesses made in the network by the station sending the join request; and conditionally granting, by the access controller, to the station sending the join request, authorisation to access the first sub-network via the wireless connection device according to said parameter, and, in the case of refusal of access to the first sub-network, granting, to said station, authorisation to access the second sub-network.

The invention claimed is:

1. A method for securing accesses to a communication network, executed by a device for securing access comprising at least one wireless connection device of the type consisting of an access point to said network and a data-frame routing device, said network comprising a first sub-network referred to as a "trusted zone" and a second sub-network referred to as a "quarantine zone", the routing device being configured so that a station connected to the network by association with the wireless connection device by means of a first sub-network identifier can access third-party devices connected in the trusted zone, and so that a station connected to the network by association with the wireless connection device by means of a second sub-network identifier cannot access third-party devices connected in the trusted zone and can access third-party devices connected in the quarantine zone, wherein the method comprises:
- sending, by the wireless connection device, information frames comprising a network identifier common to the trusted zone and to the quarantine zone,
- receiving, by the wireless connection device, a join request sent by a station, the request comprising the network identifier common to the trusted zone and to the quarantine zone,
- determining, by an access controller of the device for securing access, a parameter that is: (1) representing accesses made in said network by the station sending the join request, and (2) a value representing compliance or non-compliance with security rules or security behaviour defined and satisfying a security level sought in the communication network, obtained by comparing accesses made by said station with standard accesses defined in accordance with a catalogue of accesses, the spatial or temporal distribution of which are judged to be illegal within the communication network with respect to said security rules or security behaviour defined and satisfying a security level sought in the communication network,
- conditionally granting, by the access controller of the device for securing access, to the station sending the join request, an authorisation to access the trusted zone via the wireless connection device according to said parameter, and, in the case of refusal of access to the trusted zone, granting, to said station, authorisation to access the quarantine zone or to a third sub-network,
- refusing authorisation to access the trusted zone and granting authorisation to access the quarantine zone to the station when the station first connects to the communication network, and
- granting authorisation to access the trusted zone to the station and refusing authorisation to access the quarantine zone to the station when no access from said station to the communication network is identified as illegal after a predetermined period of time as from the station's first connection to the communication network.

2. The securing method according to claim 1, the first and second sub-network identifiers being identifiers of a basic set of services, preferentially implemented in the form of MAC addresses.

3. The securing method according to claim 2, wherein the access controller uses a list of identifiers of stations authorised to access the trusted zone or forbidden to access the trusted zone, according to said parameter.

4. The securing method according to claim 1, the wireless connection device being a first wireless connection device, the network using a second wireless connection device of the type comprising an access point to said network, the first and second sub-network identifiers being respectively identifiers of the first wireless connection device and of the second wireless connection device, preferentially MAC addresses, and the authorisation to access the quarantine zone being dependent on accesses made via the second wireless access point.

5. The method according to claim 1, comprising:
- disassociating a station from the wireless connection device according to the value of said parameter.

6. The method according to claim 1, comprising:
in the case of refusal of access to a station to the trusted zone, isolating this station by forbidding it to access the trusted zone and the quarantine zone, and authorising it to access said third sub-network identifiable by this station by means of the common network identifier.

7. A non-transitory storage medium storing a computer program product, the computer program product comprising program code instructions for executing the steps of the method according to claim 1, when said program is executed by a processor.

8. A device for securing access to a communication network comprising at least one wireless connection device of the type consisting of an access point to said network and a data-frame routing device, the device comprising a first interface for connection to a first sub-network referred to as a "trusted zone" of said network, a second interface for connection to a second sub-network referred to as a "quarantine zone" of said network, and a routing device configured so that a station connected to the network by association with the access point by means of a first sub-network identifier can access third-party devices connected in the trusted zone, and so that a station connected to the network by association with the wireless connection device by means of a second sub-network identifier cannot access third-party devices connected in the trusted zone and can access third-party devices connected in the quarantine zone, the securing device being wherein the device comprises:
  a transmitter configured for sending, by the wireless connection device, information frames comprising a network identifier common to the trusted zone and to the quarantine zone,
  a receiver configured for receiving, by the wireless connection device, a join request sent by a station, the request comprising the network identifier common to the trusted zone and to the quarantine zone,
  an access controller comprising a processor and configured for determining a parameter that is: (1) representing accesses made in said network by the station sending the join request, and (2) a value representing compliance or non-compliance with security rules or security behaviour defined and satisfying a security level sought in the communication network, obtained by comparing accesses made by said station with standard accesses defined in accordance with a catalogue of accesses, the spatial or temporal distribution of which are judged to be illegal within the communication network with respect to said security rules or security behaviour defined and satisfying a security level sought in the communication network, and for conditionally granting, to the station sending the join request, an authorisation to access, to the trusted zone, via the wireless connection device according to said parameter, and, in the case of refusal of access to the trusted zone, granting to this station authorisation to access the quarantine zone, the access controller being further configured for refusing authorisation to access the trusted zone to the station when the station first connects to the communication network, and for granting authorisation to access the trusted zone to the station and refusing authorisation to access the quarantine zone to the station when no access from said station to the communication network is identified as illegal after a predetermined period of time as from the station's first connection to the communication network.

9. The device according to claim 8, configured to implement a function of gateway for access between a wide-area network and a local network consisting of said trusted zone.

* * * * *